United States Patent

[11] 3,629,589

| [72] | Inventors | Franz Gleixner<br>Munich-Pasing;<br>Heinz Schreyer, Munich, both of<br>Germany |
|---|---|---|
| [21] | Appl. No. | 21,816 |
| [22] | Filed | Mar. 23, 1970 |
| [45] | Patented | Dec. 21, 1971 |
| [73] | Assignee | Erwin Sick<br>Icking am Isartal, Stifterweg, Germany |
| [32] | Priority | Mar. 22, 1969 |
| [33] | | Germany |
| [31] | | P 19 14 655.5 |

[54] OPTICAL DOUBLE-BEAM MEASURING INSTRUMENT
11 Claims, 13 Drawing Figs.

[52] U.S. Cl. .................................................. 250/205,
250/218, 250/220, 350/169
[51] Int. Cl. ..................................................... G01j 1/32
[50] Field of Search ........................................... 250/205,
227, 216, 220, 218; 350/169

[56] References Cited

UNITED STATES PATENTS

| 2,690,511 | 9/1954 | Elion | 250/205 |
| 3,407,267 | 10/1968 | Smith | 250/227 |
| 3,428,815 | 2/1969 | Thompson | 250/220 X |
| 3,509,359 | 4/1970 | Embling | 250/205 X |
| 3,510,665 | 5/1970 | Goolsby | 250/220 X |
| 3,487,225 | 12/1969 | Button | 250/220 |

*Primary Examiner*—Walter Stolwein
*Attorney*—Darbo, Robertson & Vandenburgh

ABSTRACT: Before traversing the area in which conditions are to be measured, a portion of a modulated luminous measuring beam is branched off and directed to a photoelectric detector. A portion of a modulated luminous comparison beam also is branched off and sent to the detector. The strengths of the beams received by the detector are compared and used to control the intensity of one or both of the beam sources in a manner such that the ratio of intensities of the two sources is constant.

OPTICAL DOUBLE-BEAM MEASURING INSTRUMENT

BACKGROUND AND SUMMARY OF THE INVENTION

This invention relates to an optical double-beam measuring instrument comprising a measuring beam or rays directed on a measuring path, and a comparison beam of rays the intensities of which are compared with each other by a first comparator, after the measuring beam of rays has traversed the measuring path, in which measuring and comparison beams or rays each originate from a separate light source modulated by electric signals.

Optical double-beam measuring instruments are prior art in which measuring and comparison beams of rays originate from a common light source, and, after the measuring beam of rays has traversed a measuring path on which it is attenuated by absorption and/or scattering at a sample (for instance, in a flue gas channel) the two beams of rays are directed onto a common photoelectric detector. By originating the two beams of rays from the same light source and impinging them upon the same detector, it is ensured that changes in the light source or in the detector affect the two beams or rays in like manner, so that no errors may thereby occur.

It is, however, necessary to separate from each other the signals which are generated at the photoelectric detector by the two beams of rays. For this purpose, the two beams of rays are modulated in different phases. To achieve this, rotating apertured disks or the like are required. Such rotating mechanical elements involve certain disadvantages: for example, movable mechanical elements are not particularly desirable in optical instruments. In addition, the modulation frequency attainable and thus, the speed at which deviations of the measuring beam of rays from the comparison beam of rays can be determined, is limited by an upper limit value.

For this reason, a double-beam measuring instrument has been prior art in which measuring and comparison beams of the rays originate from a separate light source each adapted to be modulated by electric signals. Such separate light sources take the form of a luminescence diode. Each of these luminescence diodes is modulated by electric signals in a particular manner. It is true, by this movable mechanical elements are avoided, and modulation can be effected at relatively high frequencies. A disadvantage is that the measuring and comparison beams of rays originate from separate light sources so that, for example, voltage variations will cause deviations in the intensities of measuring and comparison beams of rays. Other deviations may result from the aging of the luminescent diodes. The easier modulability of the beams of rays is therefore obtained at the cost of other disadvantages.

It is an object of this invention to provide an optical double-beam measuring instrument which, on the one hand, permits a modulation of measuring and comparison beams of rays without movable mechanical elements, while, on the other hand, being independent of aging phenomena or other changes in the light sources.

According to the invention this is attained in that a first partial beam of rays is branched from the measuring beam of rays originating from the light source, prior to traversal of the measuring path, and a second partial beam of rays is branched from the comparison beam of rays. Both partial beams are directed onto a second comparator by which the ratio of the emitted luminous fluxes of the two beams is controllable to a constant value by a control of the light source intensities.

Therefore, the apparatus according to the invention, on the one hand, operates with two separate light sources adapted to be modulated by electric signals, preferably luminescence diodes, while, however, on the other hand provision is made by a second comparator that the emitted luminous fluxes in measuring and comparison beams of rays are maintained in a fixed ratio to each other. This results in a reliable arrangement avoiding the disadvantages of the prior art.

The invention may be realized in that reflectors are disposed in the paths of rays of measuring and comparison beams or rays, that the beams of rays reflected back on themselves by the reflectors are directed in the returning path of rays through one partially transmitting mirrors at the same time serve for bracing the partial beams of rays for the second comparator in the advancing path of rays. In this manner, an additional attention of the beams by the branched partial beams of rays is avoided since as partial beams of rays of the luminous fluxes inevitably reflected at the partially transmitting mirrors in the advancing path of rays are utilized.

It is advantageous if the first and second comparators each have a photoelectric detector conjointly for measuring and comparison luminous fluxes, and if in a manner similar for both detectors the one luminous flux and the partial luminous flux, respectively, impinge upon the detector via a deflecting mirror and the other one is superimposed on the former luminous flux via a partially transmitting mirror.

For pulse-modulated beams of rays the control of the light source intensities to a constant ratio may be accomplished by applying the signal of the photoelectric detector of the second comparator as set point value alternating to a first and second amplitude controller through a synchronous switch controlled by a clock, by preestablishing a set point value for both amplitude controllers by a common set point value for both and by alternately applying the outputs of the amplitude controllers through a second synchronous switch controlled by the same clock to a control generator also controlled by the same clock which supplies the luminescence diodes for measuring and comparison beams of rays in pulselike manner through a third synchronous switch controlled by the clock.

The evaluation of the actual measuring signals can be accomplished in such a manner that the signal of the photoelectric detector of the said first comparator can be applied alternatingly to a first and a second channel through a variable amplifier and a fourth synchronous switch controlled by the same clock, that an evaluation and indicating device is provided in the first channel, and that the second channel includes an amplitude controller for which a constant set point value is preestablished and by the controller output of which the variable amplifier is controlled so as to keep the amplitude in the second channel constant.

By this manner, the ratio of the signals of measuring and comparison beams of rays is provided with a so-called "pilot technique" by keeping the one signal at a constant value by a variable amplifier acting on both signals, while the other signal is applied to the indicator.

The invention may, however, also be realized in a manner such that the two luminiscence diodes for measuring and comparison beams or rays are modulated by one control generator each at different frequencies, that the signal from the photoelectric detector of the said second comparator is applied as actual value to one amplitude controller each through two filters adapted to a respective one of the said frequencies, that for the two amplitude controllers a set point value is preestablished by a common set point value transmitter, and that each controller output controls sense. Of course, also with such a two-frequency method the ratio of the intensities of returning measuring and comparison beams of rays can be measured with a pilot technique.

Instead, also a phase modulation can be effected and balancing be effected by optical means, such as an optical wedge, a comb-shaped attenuator or the like until the intensities of measuring and comparison beams of rays acting on the detector of the first comparator are equal. Then, the travel of adjustment of the optical wedge or the comb-shaped attenuator is indicative of the attenuation of the measuring beam of rays on the measuring path. These are prior art techniques.

DESCRIPTION OF SPECIFIC EMBODIMENTS

Figure 1:
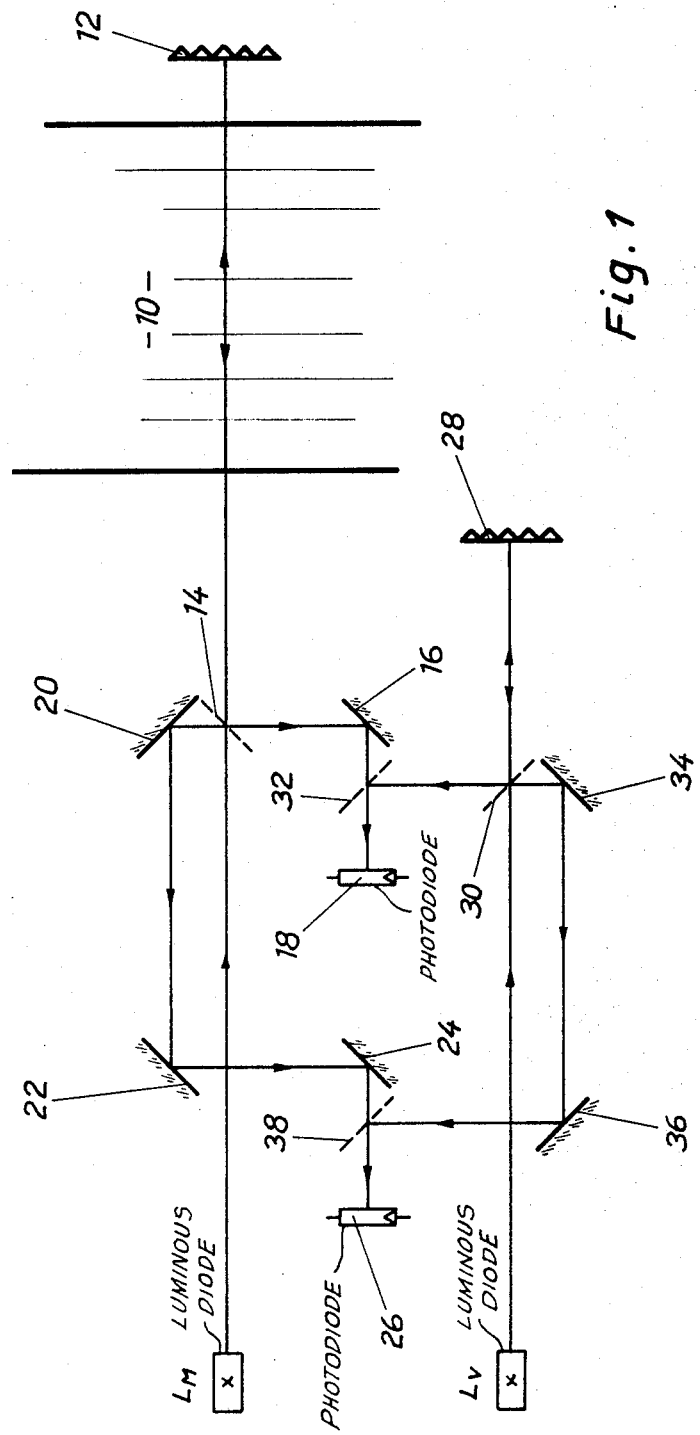
FIG. 1 illustrates schematically the optical path of rays of a smoke meter designed in accordance with the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

A measuring beam of rays with the luminous flux $\Phi M$ originates from a luminiscence diode $L_M$. A comparison beam of rays with the luminous beam $\Phi V$ originates from a luminiscence diode $L_V$. The measuring beam of rays traverses a flue gas channel 10 and impinges upon a reflector 12 on the other side of the flue gas channel. At the reflector 12 the beam of rays is reflected back on itself. It once more traverses the flue gas channel 10 and impinges upon a 50 percent partially transmitting mirror 14. The mirror 14 is inclined at 45° with respect to the beam axis so that the returning measuring beam or rays (the luminous flux $\Phi M$, attenuated by absorption in the flue gas channel 10) is deflected by 90° and impinges upon a photodiode 18 via a deflecting mirror 16. The beam from luminescence diode $L_M$ was previously divided at the mirror 14 to form a partial beam of rays directed toward mirror 20. This partial beam of rays is utilized in accordance with the invention and is deflected onto a second photodiode 26 via deflecting mirrors 20, 22 and 24.

The path of rays of the comparison beam of rays with the luminous flux $\Phi V$ is similar. After a relatively short path the comparison beam of rays strikes a reflex reflector 28 from which it is reflected back on itself to a partially transmitting mirror 30 inclined at 45° with respect to the beam axis. From mirror 30 it is also deflected onto beam photodiode 18 by a partially transmitting mirror 32. The mirrors are arranged on such a manner that the paths of rays of the returning measuring beam of rays and the returning comparison beam of rays coincide at the photodiode 18. Also, a proportion of the comparison beam of rays leaving the diode $L_V$ is reflected at the mirror 30 in the advancing path of rays. The partial beam of rays thus obtained is also deflected onto the photodiode 26 via deflecting mirrors 34, 36 and a partially transmitting mirror 38. Here, too, the arrangement has been provided so that the paths of rays of the partial beams of rays branched from the measuring beam of rays and from the comparison beam of rays, coincide at the photodiode 26. The arrangement of the mirrors 16 and 32 is substantially the same as that of the mirrors 24 and 38.

By this, the photodiode 18 receives luminous fluxes from the returning measuring beam of rays which has twice traversed the measuring path (flue gas channel 10), and from the comparison beam of rays which has been reflected at the reflex reflector 28 without any substantial attenuation. These two luminous fluxes $\Phi M$ and $\Phi V$, are compared with each other in the customary manner in order to obtain an indication of the attenuation of the measuring beam of rays in the flue gas channel 10 and, thus, of the flue gas density.

Luminous fluxes proportional to the luminous fluxes of the advancing luminous beams $\Phi M$ and $\Phi V$ respectively are applied to photodiode 26. That is, these are the luminous fluxes which are actually emitted by the luminescence diodes $L_M$ and $L_V$. These two luminous fluxes are compared with each other and thereby provision is made that, once set, the ratio of the luminous fluxes as emitted remains at a constant value; that is, by way of example, the two luminous fluxes are equal.

Figure 2:
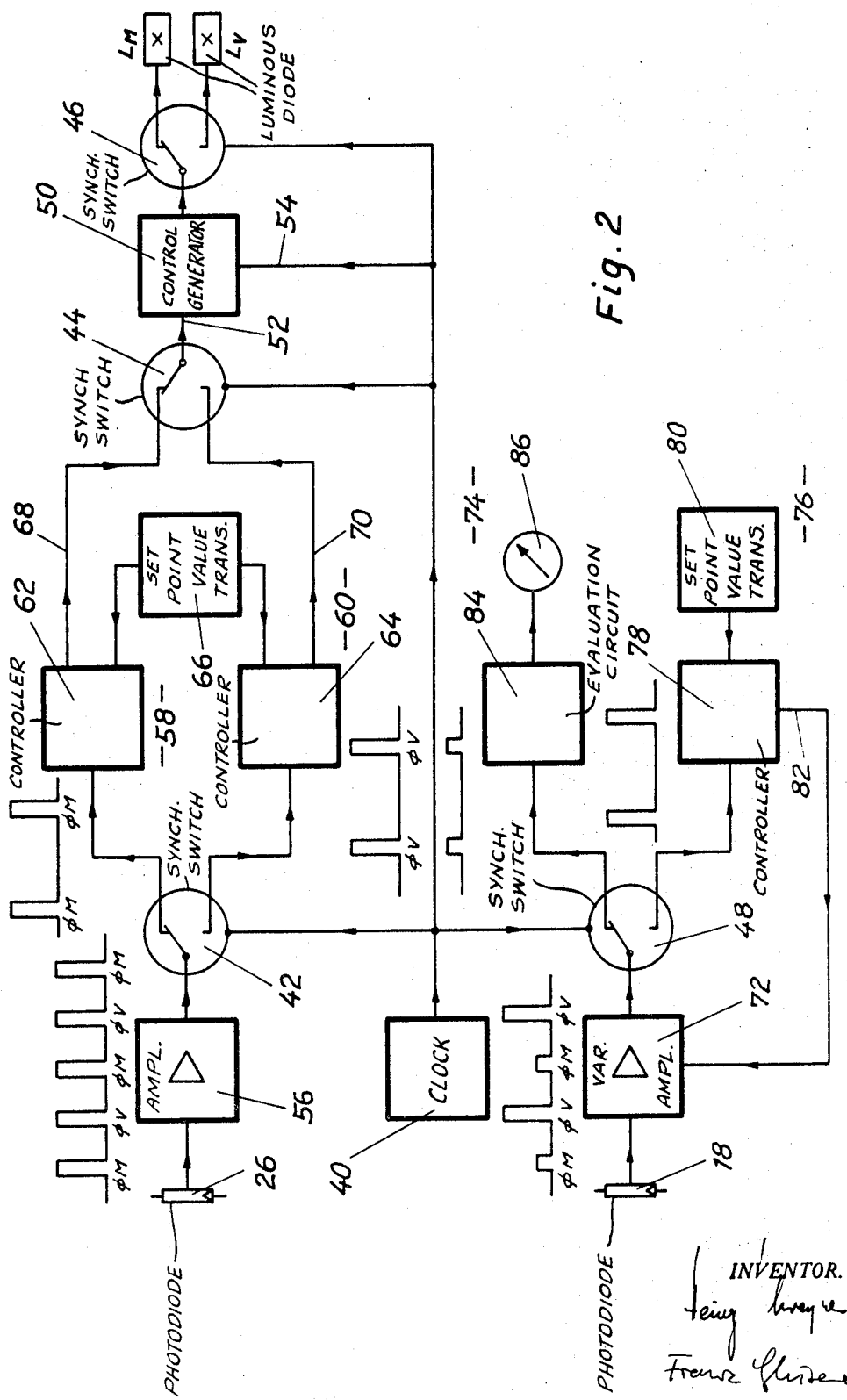
FIG. 2 illustrates one possibility of the associated electric circuit as block diagram.

FIG. 2 illustrates a block diagram of a possible circuit arrangement by which this can be achieved.

The circuit arrangement of FIG. 2 comprises a clock 40 which controls a first synchronous switch 42, a second synchronous switch 44, a third synchronous switch 46, and a fourth synchronous switch 48. Moreover, the clock 40 controls a control generator 50 for the luminescence diodes $L_M$ and $L_V$. The control generator 50 generates pulses for exciting the luminescence diodes $L_M$ and $L_V$ respectively. The magnitude of the pulses is controllable through a control input 52 of the control generator (control means). Through a control input 54 of the control generator 50 these pulses are synchronized by the clock 40i. Through the synchronous switch 46 pulses are alternatingly applied to the luminescence diode $L_M$ of the measuring beam of rays and the luminescence diode $L_V$ of the comparison beam of rays. Then, pulses of the indicated type occur across the photodiode 26, which pulses alternating originate from the measuring beam of rays and from the comparison beam of rays. These pulses are amplified in an amplifier 56 and alternatingly applied to a first and second channel 58 and 60, respectively, by the synchronous switch 42. Thus, the channel 58 receives the pulses from the measuring beam of rays, while the channel 60 receives the pulses from the comparison beam of rays, as is also indicated. In each channel is an amplitude controller, 62 and 64 respectively, to which the pulses are supplied as actual values. For the controllers 62 and 64 set point values are preestablished by a common set point value a control voltage for the pulses of the measuring beam of rays and the comparison beam of rays respectively, is obtained across an output, 68 and 70 respectively. These control voltages are alternatingly applied to the input 52 of the control generator 50 through the synchronous switch 44. By this, the excitation of the luminescence diodes $L_M$ and $L_V$ is controlled so that, for example, equal pulse amplitudes are obtained.

At the same time the clock 40 controls the synchronous switch 48. The signal from the photodiode 18 is alternatingly applied to a first channel 74 or a second channel 76 through a variable amplifier 72 and the synchronous switch 48. In the second channel (76) to which the pulses of the comparison beam or rays are thereby supplied, there is an amplitude controller 78. A set point value for controller 78 is preestablished by a set point value transmitter 80, and a control voltage is obtained as a function of the deviation of the pulses from switch 48 as compared to the set point input. This control voltage appearing at an output 82 is used to vary the gain of the variable amplifier 72. The pulses originating from the comparison beam of the rays are therefore maintained at a constant amplitude across the output or the variable amplifier 72.

An evaluation circuit 84 and an indicator 86 are provided in the channel 74 to which the pulses from the measuring beam of rays are supplied. Since the pulse amplitude in channel 74 is controlled by the same factor as the pulse amplitude in channel 76, an indication is obtained at meter 86 which is proportional to the ratio of the pulse amplitudes of measuring and comparison beams of rays.

Figure 3:
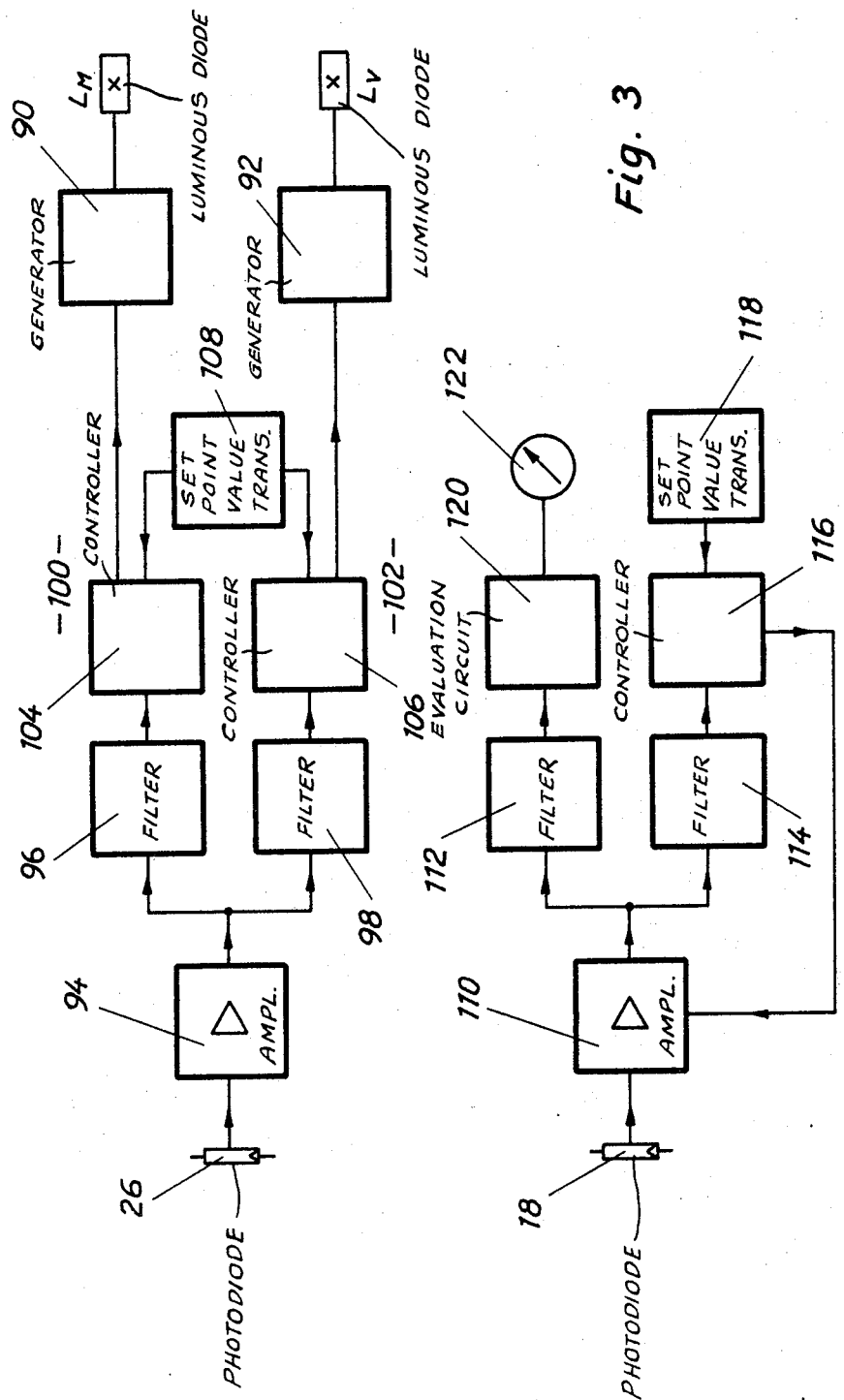
FIG. 3 illustrates another possibility of the electric circuit, also as block diagram.

In the arrangement according to FIG. 3, the luminescence diodes $L_M$ and $L_V$ are each energized at different frequencies by respective generators 90 and 92, so that the luminous beams are modulated at different frequencies. The signals across the photodiode 26 are amplified in an amplifier 94 and the two frequencies are separated by suitable band-pass filters 96 and 98 so that the signals from measuring beam of rays and from comparison beam of rays are applied to separate channels 100 and 102, respectively. In each of these channels there is provided an amplitude controller 104 and 106, respectively. For the two amplitude controllers 104 and 106 one set point value each is preestablished by a common set point value transmitter 108. The controllers 104 and 106 supply control voltages which are applied to the control generators 90 and 92 respectively. In turn, the control generators regulate the emission of luminous fluxes by the luminescence diodes $L_M$ and $L_V$ in a manner such that the ratio of these luminous fluxes is kept at a constant value (by way of example, the two luminous fluxes are maintained equal).

The evaluation of the returning beams of rays which become effective at the photodiode 18 is effected similarly to the embodiment of FIG. 2 by means of a pilot technique. The signals supplied by the photodiode 18 are amplified in an amplifier 110. The signals are separated by frequencies in filters 112 and 114. The signals obtained from the comparison beam of rays are applied to a controller 116 for which a set point value is preestablished by a set point value transmitter 118. The control voltage of the controller 116 controls the gain of the common variable amplifier 110. The signals from the measuring beam of rays are supplied to an evaluation circuit 120 and an indicator 122 through the filter 112.

Figure 4:
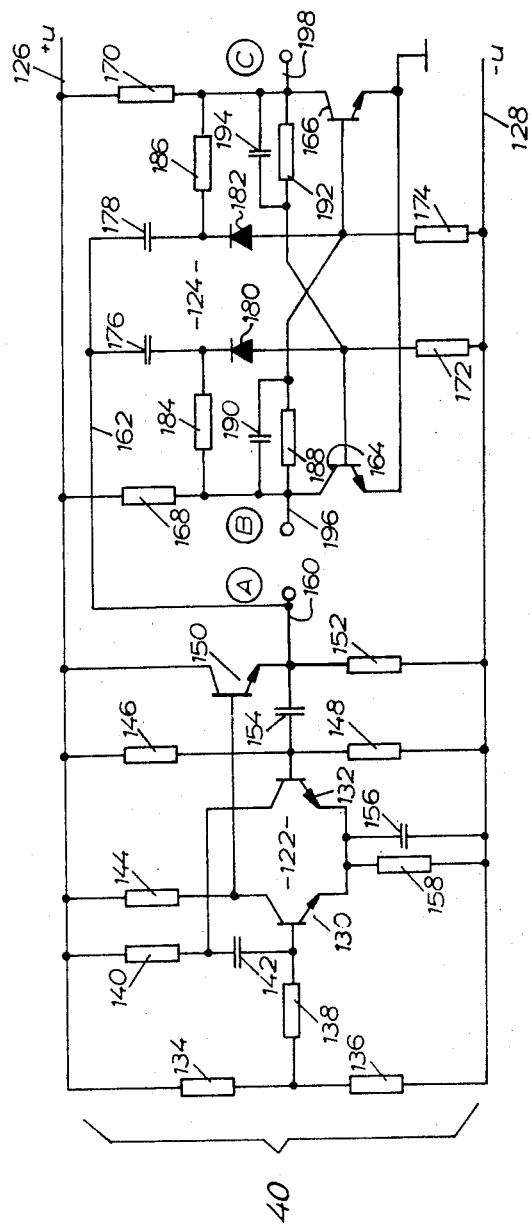
FIG. 4 illustrates one embodiment of a clock that can be used in the circuit of FIG. 2.

FIG. 4 shows a typical clock that can be used as element 40 in the circuit of FIG. 2. The clock comprises an unsymmetric multivibrator, generally designated 122, and a flip-flop 124. Supply voltage +U and −U with respect to ground are applied to lines 126 and 128, respectively. Unsymmetric multivibrator 122 comprises two PNP-transistors 130 and 132. The base electrode of transistors 130 is biased through a voltage divider formed by resistors 134 and 136 the junction of which is connected to the said base electrode through resistor 138. In addition the base electrode of transistor 130 is connected to line 126 through resistor 140 and capacitor 142. The junction of resistor 140 and capacitor 142 is connected to the collector electrode of transistor 132. The collector electrode of transistor 130 is connected to the +U supply line through collector resistor 144. The vase electrode of transistor 132 is biased through a voltage divider comprising resistors 146 and 148. The circuit further comprises an NPN-transistor 150 which is connected across supply lines 126 and 128 with a resistor 152. The base electrode of transistor 150 is connected to the collector electrode of transistor 130 while the emitter electrode of transistors 150 is connected to the base electrode of transistor 132 through a capacitor 154. A capacitor 156 and a resistor 158 parallel thereto are connected in the common emitter circuit of transistors 130 and 132.

The emitter of transistor 150 is connected to a first output terminal 160.

Figure 5:
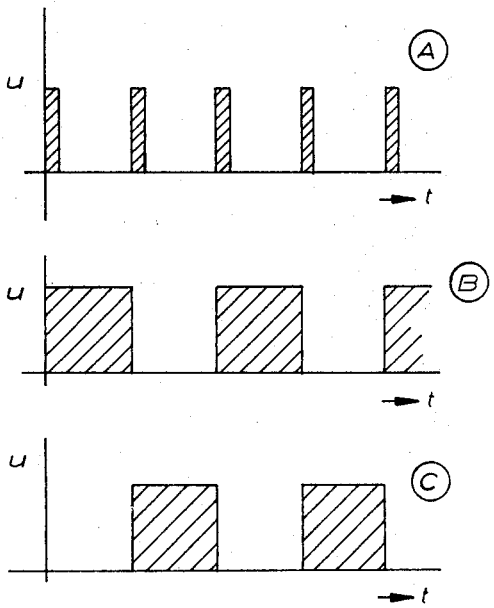
FIG. 5 illustrates the signal waveforms appearing in various points of the circuit of FIG. 4.

The operation of this circuit is conventional and a sequence of pulses appears at terminal 160 as shown at "A" in FIG. 5. The frequency and pulses width of these pulses is determined by the parameters of the circuit element as will be apparent to those skilled in the art.

Figure 6:
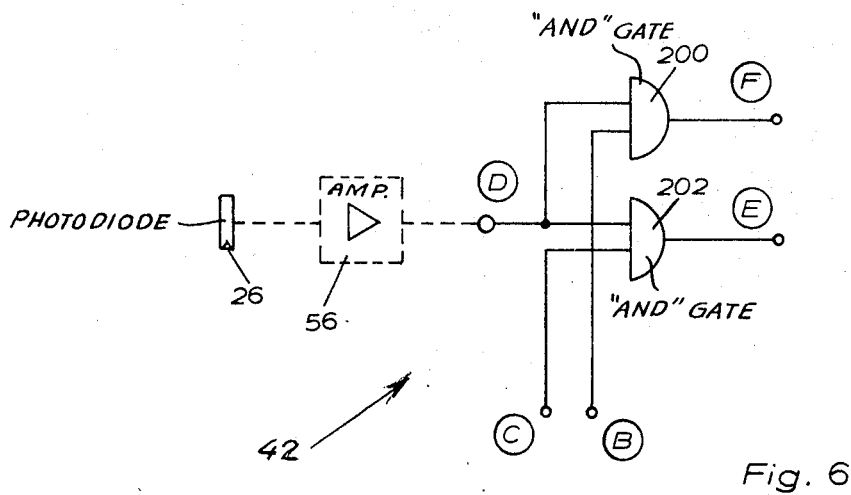
FIG. 6 illustrates an embodiment of a synchronous switch that can be used in the circuit of FIG. 2.
Figure 7:
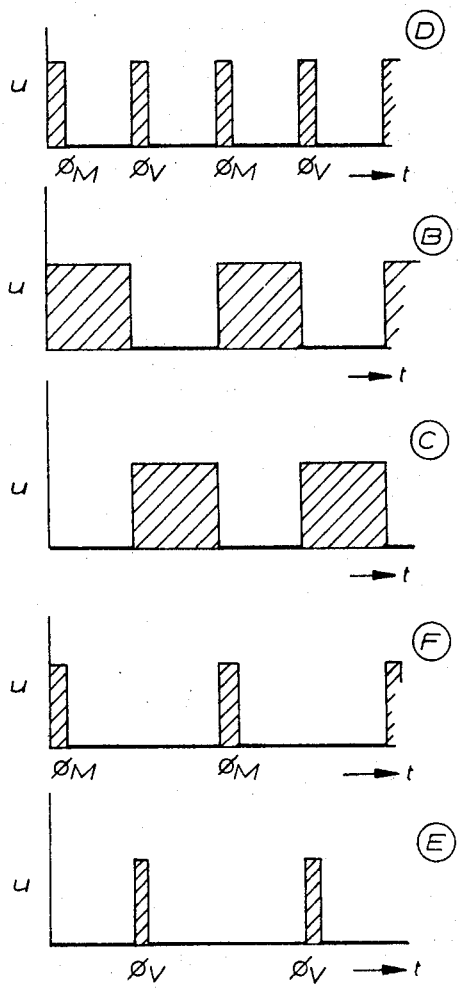
FIG. 7 illustrates the signal waveforms appearing in various points of the circuit of FIG. 6.

The signals "A" from terminal 160 are used to control the control generator 50 as shown in FIG. 2. In addition these signals are fed through line 162 to flip-flop 124, which is of conventional type. Flip-flop 124 comprises two NPN-transistors 164 and 166. The collector electrodes of transistors 164 and 166 are connected to the positive supply line 126 through resistors 168 and 170, respectively. The base electrodes of transistor 164 and 166 are connected to the negative supply line 128 through resistor 172 and 174, respectively. In addition, these base electrodes are connected to signal line 162 through capacitors 176 and 178 and diodes 180, 182, respectively. The junction of capacitor 176 and diode 180 is connected to the collector electrode of transistor 164 through resistor 184. In similar manner the junction of capacitor 178 and diode 182 is connected to the collector electrode of transistor 166 through resistor 186. The collector electrode of transistor 164 is further connected to the base electrode of transistor 166 through resistor 188 and parallel capacitor 190. On the other hand, the collector electrode of transistor 166 is connected to the base electrode of transistor 164 through resistor 192 and parallel capacitor 194. The collector electrodes of transistors 164 and 166 are connected to output terminals 196 and 198, respectively. The flip-flop 124 operates in conventional manner. A first pulse on line 162 will make one transistor, say 164, conducting and the other transistor 166 nonconducting. The next pulse on line 162 will then make transistor 166 conducting and transistor 164 nonconducting again. The pulse sequence "A" from terminal 160 will therefore produce complementary square wave output of half the frequency signals on output terminals 196 and 198 as shown at "B" and "C" in FIG. 5. These signals can be used to control the synchronous switches as will be explained hereinbelow with reference to FIG. 6. FIG. 6 shows a typical synchronous switch which can be used for elements 42, 46 and 48 of FIG. 2. The synchronous switch comprises two AND-gates 200 and 202. The pulse signals, such as ΦM and ΦV from photodiode 26, are applied to one input of each AND-gate 200 and 202. Signal "B" from clock 40 (FIG. 5) is applied to the second input of AND-gate 200 and signal "C" from clock 40 is applied to the second input of AND-gate 202. As can best be seen from FIG. 7, the output "F" from AND-gate 200 will contain only the ΦM-pulses, which occur simultaneously with the "B"-signal, while the output "E" from AND-gate 202 contains only the ΦV-pulses, which are synchronous with signal "C."

Figure 8:
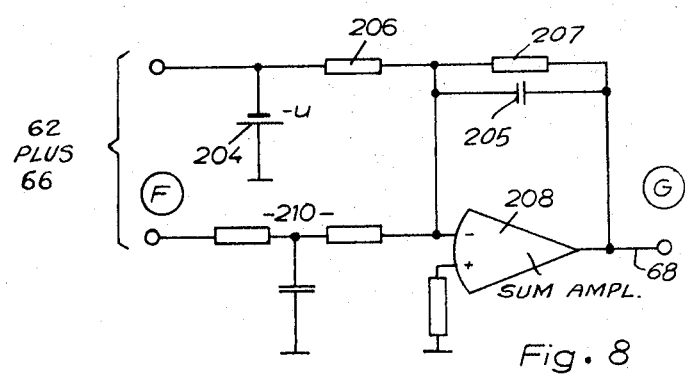
FIG. 8 is a wiring diagram of an amplitude controller and a set point value transmitter in the circuit of FIG. 2.

FIG. 8 illustrates an amplitude controller and set point value transmitter which could be used for elements 62 and 66 in FIG. 2. The set point value transmitter 66 is simply a standard voltage source 204 which is connected through resistor 206 to the input of a summing amplifier 208. The summing amplifier is a conventional operational amplifier with a capacitor 205 and a resistor 207 parallel thereto in the feedback loop. By means of the capacitor 205 and resistor 207 pulsed input signals are averaged. At the input of summing amplifier is the pulsed signal "F" (FIG. 7) formed by the ΦM-pulses but averaged and smoothed by means of filter 210. Both positive and negative DC output voltages "G" can appear at the output of amplifier 208 depending on the deviation of the pulse width or amplitude from a desired set point.

Figure 9:
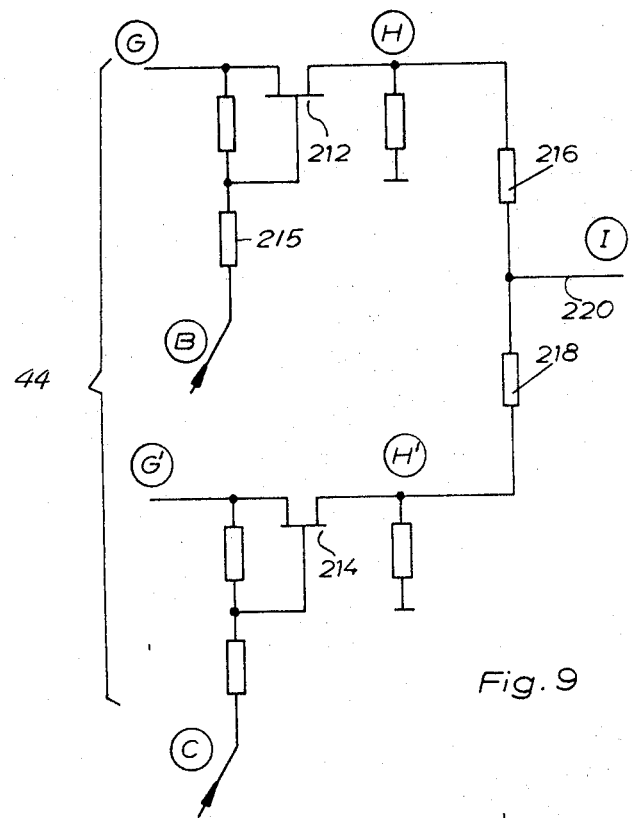
FIG. 9 is a wiring diagram of another type of a synchronous switch for use in the circuit of FIG. 2.
Figure 10:
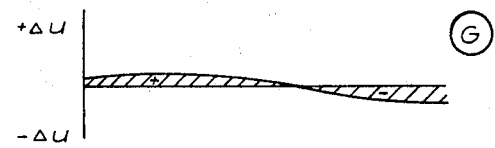
FIG. 10 illustrates signal waveforms appearing in various points of the circuit of FIG. 9.
Figure 10:
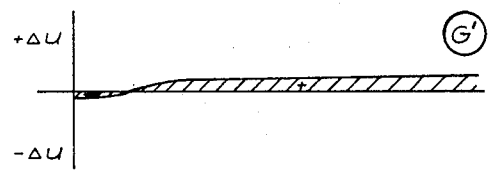
Figure 10:
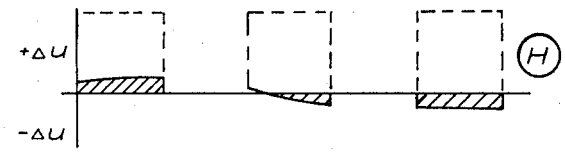
Figure 10:
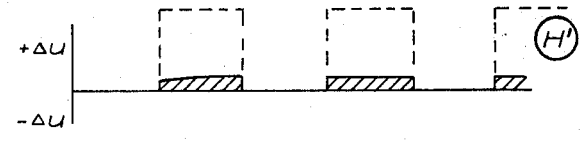
Figure 10:
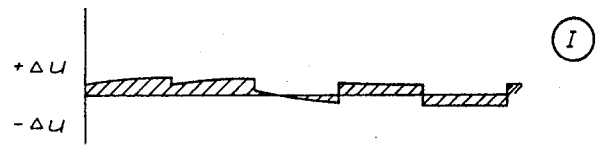

FIG. 9 illustrated a synchronous switch which can be used for element 44 in FIG. 2. This synchronous switch is a little different from synchronous switches 42, 46 and 48 as illustrated in FIG. 6, as it has to be adapted for other positive and negative voltages to be switched ("G" from amplitude controller 62, for example). The synchronous switch of FIG. 9 comprises two field-effect transistors 212 and 214. Field-effect transistor 212 is in the circuit of DC signal "G" from amplitude controller 62. It is made alternatingly conductive and nonconductive by signal "B" from clock 40 (FIG. 2), this signal being applied to the grid electrode through resistor 215. In similar manner field-effect transistor 214 is under the control of signal "C" from clock 40 and is effective to switch a DC signal G' similar to G from the other amplitude controller 64 of FIG. 2. The switched signals are combined through resistors 216, 218 and connected to an output terminal 220 leading to the control generator 50 (FIG. 2). FIG. 10 illustrates (very much simplified) signal waveforms appearing at various points in the circuit of FIG. 9.

Figure 11:
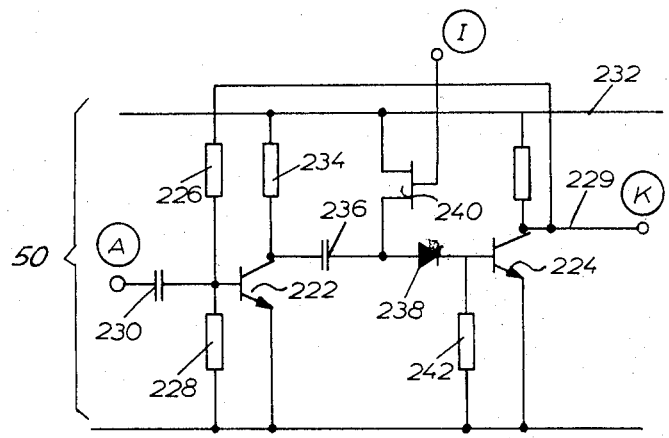
FIG. 11 is a wiring diagram of a control generator that can be used in the circuit of FIG. 2.
Figure 12:
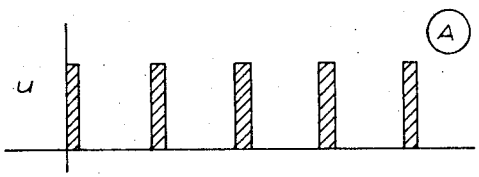
FIG. 12 illustrates signal waveforms appearing in various points of the circuit of FIG. 11.
Figure 12:
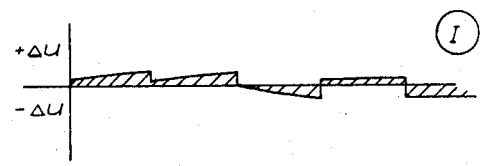
Figure 12:
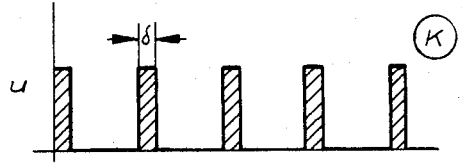
Figure 13:
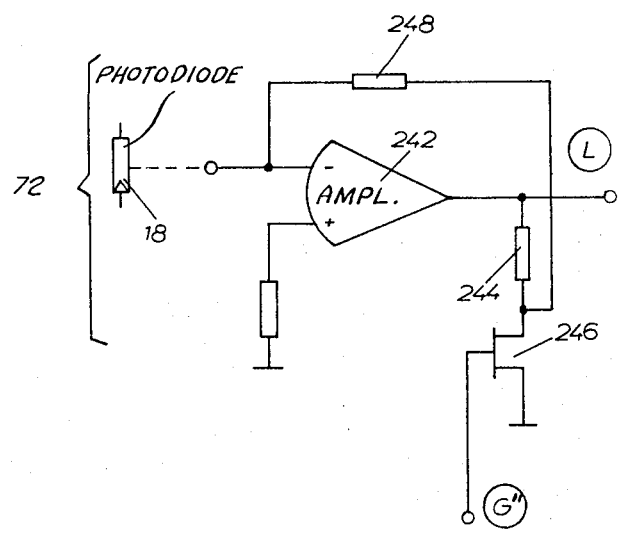
FIG. 13 illustrates a variable amplifier for use in the circuit of FIG. 2.

The control generator 50 may be a monostable flip-flop of which the pulse width is variable as a function of an input signal "I" (FIG. 9, 10 and 11). The monostable flip-flop comprises two transistors 222 and 224. The base electrode of transistor 222 is biased through a voltage divider comprising resistors 226 and 228 connected to output terminal 229. In addition, the pulse signal "A" from clock 40 is applied to base electrode of transistor 222 through a capacitor 230. The collector electrode of transistor 222 is connected to the supply

UNITED STATES PATENT OFFICE
CERTIFICATE OF CORRECTION

Patent No. 3,629,589                    Dated December 21, 1971

Inventor(s) Franz Gleixner, Heinz Schreyer

It is certified that error appears in the above-identified patent and that said Letters Patent are hereby corrected as shown below:

NOTE: The line numbers represent the actual count.

Column 1, line 8, after "beams" "or" should read --of--. Column 1, lines 25 - 27, after "different" insert --manner, for instance at different frequencies or with different--. Column 1, line 37, end of line, after "beams of" delete "the". Column 1, line 75, first word in line "or" should read --of--. Column 2, line 2, after "transmitting" insert --mirror inclined to the beam axis onto a common radiation detector of the first comparator, and that these partially transmitting--. Column 2, line 3 "bracing" should be --branching--. Column 2, line 5, "attention" should read --attenuation--. Column 2, line 19, "alternating" should read --alternatingly--. Column 2, line 22, after "value" change "for both" to read --transmitter--. Column 2, line 25, before "clock" delete "same". Column 2, line 47, "beams or" should read --beams of--. Column 2, line 54, after "controls" insert --one of the control generators in an amplitude-controlling--. Column 3, line 42, "beam or" should read --beam of--.

Column 3, line 55, "beam" should read --the--. Column 3, line 56, "on" should read --in-- after "arranged". Column 4, line 27, "40 i" should read --40--. Column 4, line 32, "alternating" should read --alternatingly--. Column 4, line 42, after "value" insert --transmitter 66. These serve as comparison means and upon deviation of the pulse amplitudes from the setpoint value,--. Column 4, line 55, "or" should read --of--. Column 4, line 63, "or" should read --of--. Column 5, line 33, "to" should read --at--. Column 5, line 35 "transistors" should read --transistor--. Column 5, line 45, "vase" should read --base--. Column 5, line 51, "transistors" should read --transistor--. Column 5, line 59, "pulses" should read --pulse--. Column 5, line 69, "transistor" should read --transistors--. Column 5, line 70, "resistor" should read --resistors--. Column 6, line 49, "other" should read --both--.

UNITED STATES PATENT OFFICE
CERTIFICATE OF CORRECTION

Patent No. 3,629,589      Dated December 21, 1971

Page - 2 -

Inventor(s) Franz Gleixner, Heinz Schreyer

It is certified that error appears in the above-identified patent and that said Letters Patent are hereby corrected as shown below:

Column 7, line 10, after "A" insert --is--. Column 7, line 56, before "comparison" insert --said--. Column 9, line 2, after "modulating said" change "other" to --one--; insert --first-- before "frequency"

Signed and sealed this 22nd day of May 1973.

(SEAL)
Attest:

EDWARD M. FLETCHER, JR.      ROBERT GOTTSCHALK
Attesting Officer      Commissioner of Patents